(12) United States Patent
Park et al.

(10) Patent No.: US 11,612,266 B2
(45) Date of Patent: Mar. 28, 2023

(54) STEAM EXHAUSTING DEVICE AND ELECTRIC PRESSURE COOKER COMPRISING STEAM EXHAUSTING DEVICE

(71) Applicant: LG Electronics Inc., Seoul (KR)

(72) Inventors: Byungkyu Park, Seoul (KR); Hyeunsik Nam, Seoul (KR); Wan Soo Kim, Seoul (KR); Woo Jin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 530 days.

(21) Appl. No.: 16/794,965

(22) Filed: Feb. 19, 2020

(65) Prior Publication Data
US 2021/0007531 A1    Jan. 14, 2021

(30) Foreign Application Priority Data

Jul. 10, 2019    (KR) .......................... 10-2019-0083492

(51) Int. Cl.
*A47J 27/092*    (2006.01)
*A47J 27/08*    (2006.01)
*A47J 36/38*    (2006.01)
*A47J 27/09*    (2006.01)

(52) U.S. Cl.
CPC .......... *A47J 27/092* (2013.01); *A47J 27/0802* (2013.01); *A47J 36/38* (2013.01); *A47J 27/09* (2013.01)

(58) Field of Classification Search
CPC ....... A47J 27/092; A47J 27/09; A47J 27/0802
USPC ..................... 99/337; 219/431, 435, 440, 441
See application file for complete search history.

(56) References Cited

U.S. PATENT DOCUMENTS

| 5,701,805 A | 12/1997 | Sa |
| 6,283,015 B1 * | 9/2001 | Kwon .................. A47J 27/09 99/333 |
| 11,202,528 B2 * | 12/2021 | Bang .................. A47J 27/0802 |

FOREIGN PATENT DOCUMENTS

| CN | 109090989 | 12/2018 |
| CN | 109419328 | 3/2019 |
| CN | 109567583 | 4/2019 |
| KR | 200157498 | 9/1999 |

(Continued)

OTHER PUBLICATIONS

Extended European Search Report in European Appln. No. 20155059.7, dated Jul. 30, 2020, 5 pages.

(Continued)

*Primary Examiner* — Reginald Alexander
(74) *Attorney, Agent, or Firm* — Fish & Richardson P.C.

(57) ABSTRACT

A steam exhausting device coupled to a cover of an electric pressure cooker includes: a housing that has an upper surface defining a first opening and a lower surface defining a second opening; a steam pipe that is spaced apart from the second opening and that extends along a vertical line passing the second opening; a pressure member arranged in the housing along the vertical line and configured to move down to a discharge end of the steam pipe; a lever disposed in the housing and having a first end connected to the pressure member; a button connected to a second end of the lever and configured to move vertically along a vertical axis passing the first opening, where the button includes a magnetic body; and an electromagnet disposed at a bottom surface of the housing. The vertical axis passes the electromagnet.

9 Claims, 11 Drawing Sheets

(56) References Cited

FOREIGN PATENT DOCUMENTS

| KR | 10-0529926 | 11/2005 |
| KR | 100529926 | 11/2005 |
| KR | 20060091656 | 8/2006 |
| KR | 20100103778 | 9/2010 |
| KR | 101018804 | 3/2011 |
| KR | 101848175 | 4/2018 |

OTHER PUBLICATIONS

PCT International Search Report in International Appln. No. PCT/KR2020/004215, dated Jul. 14, 2020, 3 pages.

* cited by examiner

RELATED ART

STEAM EXHAUSTING DEVICE AND ELECTRIC PRESSURE COOKER COMPRISING STEAM EXHAUSTING DEVICE

CROSS-REFERENCE TO RELATED APPLICATION

The present disclosure claims priority to and the benefit of Korean Patent Application No. 10-2019-0083492, filed on Jul. 10, 2019, the disclosure of which is incorporated herein by reference in its entirety.

TECHNICAL FIELD

The present disclosure relates to a steam exhausting device that exhausts steam physically or electrically and an electric pressure cooker that electrically controls the steam exhausting device based on internal pressure.

BACKGROUND

Electric pressure cookers may cook a variety of grains such as rice using steam having a high temperature and high pressure. In some examples, the electric pressure cooker may include a steam exhausting device that may exhaust steam based on a pressure of steam generated by the electric pressure cooker being greater than a predetermined pressure level.

In some cases, where the steam exhausting device does not operate normally, the high-pressure steam may not be exhausted and the electric pressure cookers may be damaged and, in severe cases, an explosion and fire may occur.

FIG. 1 shows a steam exhausting device used for an electric pressure cooker in related art. A method of operating a steam exhausting device (e.g., a solenoid valve device 30') in related art is described below in detail with reference to FIG. 1.

Referring to FIG. 1, the electric pressure cooker may include a control valve device 40' that is intermittently opened only when an internal steam pressure of the electric pressure cooker is high, thereby discharging the steam. In some cases, fine powder or oil and fat of rice contained in the steam may be deposited in a first lower space 60*a'* defined between a lower portion of a first diaphragm 36' and an inlet path 10' and a second lower space 60*b'* defined between a lower portion of a second diaphragm 46' and an inlet path 10' during exhaust of the steam.

Based on power applied to a winding coil 32' after cooking, a second outlet 24' of an orifice 20' may be opened, and the steam exhausted through the second outlet 24' may be induced the exhaust outlet 50' located directly above the first diaphragm.

In some cases, a first portion of the steam exhausted through the second outlet 24' may be induced to the exhaust outlet 50' through a space defined between the orifice 20' and a valve body 60' and a space defined by a first diaphragm 36' and a valve body 60'.

In some cases, a second portion of the steam exhausted through the second outlet 24' may pass through the first lower space 60*a'* and the second lower space 60*b'*, and subsequently, may pass through the first diaphragm 36' and the valve body 60', and may be induced to the exhaust outlet 50'.

The steam exhausted from the second outlet 24' may be exhausted to the outside of the electric pressure cooker with deposits deposited in the first lower space 60*a'* and the second lower space 60*b'*.

In some cases, the steam exhausting device may discharge, together with the steam, fine powder, oil, fat rice, or the like deposited in the first lower space 60*a'* and the second lower space 60*b'* through the above-described operation.

In some cases, where the steam flow path and each of components of the device are not spatially separated from each other, the deposits may be deposited again at other portions of the device even if some deposits at specific portions (e.g., the first lower space 60*a'* and the second lower space 60*b'*) may be removed.

In some examples, when the deposits are deposited again at other portions of the device, cleaning devices may be very difficult due to a complicated structure of the device that defines the steam flow path.

SUMMARY

The present disclosure describes a steam exhausting device that spatially separates a steam flow path from each of components of a device from each other so that the steam may not affect components of the device during discharge of the steam.

The present disclosure also describes a steam exhausting device capable of physically or electrically exhausting the steam through a simple configuration.

The present disclosure further describes an electric pressure cooker that exhausts the steam exhausted by the steam exhausting device to outside through a sound absorbing member.

The objects of the present disclosure are not limited to the above-mentioned objects, and other objects and advantages of the present disclosure which are not mentioned can be understood by the following description and more clearly understood by the implementations of the present disclosure. It will also be readily apparent that the objects and the advantages of the present disclosure can be implemented by features described in claims and a combination thereof.

According to one aspect of the subject matter described in this application, a steam exhausting device coupled to a cover of an electric pressure cooker includes: a housing having an upper surface that defines a first opening and a lower surface that defines a second opening vertically spaced apart from the first opening; a steam pipe that is spaced apart from the second opening, that extends along a vertical line passing the second opening, and that is configured to receive steam generated by the electric pressure cooker; a pressure member that is disposed in the housing, that is arranged along the vertical line passing the second opening, and that is configured to move down to a discharge end of the steam pipe; a lever that is disposed in the housing and that has a first end connected to the pressure member; a button connected to a second end of the lever and configured to move vertically along a vertical axis passing the first opening, where the button includes a magnetic body disposed on a lower surface of the button; and an electromagnet disposed at a bottom surface of the housing. The vertical axis passes the first opening and the electromagnet.

Implementations according to this aspect may include one or more of the following features. For example, the steam exhausting device may further include a steam barrier layer made of an elastic material and disposed at a lower surface of the pressure member. The steam barrier layer may be configured to block the discharge end of the steam pipe based on the pressure member moving down to the steam pipe. A cross-sectional area of the steam barrier layer may be greater than a cross-sectional area of the second opening.

In some implementations, the steam exhausting device may further include a steam guide member that surrounds the discharge end of the steam pipe and that is configured to change, to a horizontal direction, a direction of steam discharged toward the second opening through the discharge end of the steam pipe. In some examples, the steam guide member may include an elastic body that is configured to, based on the pressure member moving down, be deformed by the pressure member to thereby block the discharge end of the steam pipe.

In some implementations, at least one of the steam pipe or the electromagnet may be bolted to a top plate of the cover that is configured to cover an inner pot of the electric pressure cooker. In some implementations, the housing may include: a first protrusion that is disposed inside the housing, that protrudes downward from the upper surface of the housing, and that is configured to guide movement of the pressure member; and a second protrusion that is disposed inside the housing, that protrudes downward from the upper surface of the housing, and that is coupled to the lever.

In some implementations, the pressure member may include: a pressure body that extends toward the second opening; a pressure end disposed vertically below the pressure body, the pressure end having a cross-sectional area greater than a cross-sectional area of the pressure body; and a spring having a first end fixed to the housing and a second end disposed at a boundary between the pressure body and the pressure end.

In some implementations, the button may further include: a button body; and a button operation part that is disposed at an upper portion of the button body and that protrudes to an outside of the upper surface of the housing through the first opening. The magnetic body may be fastened to a lower surface of the button body. In some implementations, the electromagnet may be configured to selectively generate attraction force for the magnetic body based on current applied from an outside of the housing.

According to another aspect, an electric pressure cooker includes: a main body having an upper surface that defines a body opening; an inner pot configured to be accommodated in the main body through the body opening; a cover that includes a top plate configured to cover an upper surface of the inner pot and that is configured to pivot about an edge of the main body to thereby selectively open and close the upper surface of the main body; a steam exhauster coupled to the top plate in the cover and configured to discharge steam generated in the inner pot; and a controller configured to control the steam exhauster to selectively discharge the steam based on a steam pressure inside the inner pot.

Implementations according to this aspect may include one or more of the following features. For example, the steam exhauster may include: a steam exhausting device that includes an electromagnet disposed inside the steam exhausting device and that is configured to discharge the steam in a horizontal direction of the main body through a horizontal exhaust outlet based on (i) external pressure applied to the steam exhauster or (ii) control of the electromagnet by the controller; and a noise reducing device that surrounds the steam exhausting device. The noise reducing device may define: a vertical exhaust outlet that is spaced apart from the horizontal exhaust outlet and that is open in an upper direction of the cover; and a steam flow path that extends between the horizontal exhaust outlet of the steam exhausting device and vertical exhaust outlet.

In some implementations, the noise reducing device may include a sound absorbing member disposed in the steam flow path. In some implementations, the noise reducing device may have a ring shape, and the steam flow path may be defined in a first portion of the noise reducing device and extend along a circumferential direction of the noise reducing device. In some examples, the vertical exhaust outlet may be defined in a second portion of the noise reducing device, and a circumferential length of the first portion may be greater than a circumferential length of the second portion.

In some implementations, the noise reducing device may include a plurality of sound absorbing members that are spaced apart from one another and that are arranged along a circumference the noise reducing device, where each of the plurality of sound absorbing members may be made of a porous material.

In some implementations, the electric pressure cooker may further include a temperature sensor disposed at the top plate or a pressure sensor disposed at the top plate, where the controller may be configured to receive temperature information including a temperature inside the inner pot from the temperature sensor or pressure information including a pressure inside the inner pot from the pressure sensor.

In some implementations, the electric pressure cooker may further include a temperature sensor disposed at the top plate and configured to detect a temperature inside the inner pot, where the controller may be configured to receive temperature information including the temperature inside the inner pot. In some examples, the controller may be configured to: determine a pressure inside the inner pot based on the temperature information with reference to information stored in a non-transitory memory; and control the steam exhauster based on the pressure determined based on the temperature information.

In some implementations, the controller may be configured to, based on the steam pressure in the inner pot exceeding a reference pressure, control the electromagnet to generate magnetic force to thereby control the steam exhauster to discharge the steam. In some implementations, the steam exhauster may further include a button that protrudes outside the cover and that is configured to transmit the external pressure to the steam exhausting device.

In some implementations, a housing including a pressure member, a lever, a button, an electromagnet and the like may be separated from a steam pipe so that the steam discharged by a steam pipe may not be introduced into the housing. That is, the steam flow path may be spatially separated from components of the device so that the steam may not affect components of the device.

In some implementations, a pressure member that seals the discharge end of the steam pipe based on a vertical pressure may be connected to a button which is lowered based on external pressure and operation of or an electromagnet by a lever, thereby exhausting steam physically or electrically based on a simple configuration.

In some implementations, the steam exhausted from a horizontal discharge outlet of the steam exhausting device may pass through a sound absorbing member, and the steam which has passed through the sound absorbing member may be exhausted to the vertical exhausting outlet disposed at an opposite side to the horizontal outlet, so that the steam exhausted by the steam exhausting device is exhausted to outside through the sound absorbing member.

In some implementations, the steam may not affect components of the device during discharge of the steam, thereby increasing a lifespan of devices as well as solving pipe blockage occurring due to a complicated structure to discharge the steam in related art.

In some implementations, the steam may be exhausted physically or electrically through the simple configuration, thereby reducing production cost of devices and facilitating cleaning of devices, and preventing damage of devices occurring due to the high-temperature steam.

In some implementations, the steam exhausted by the steam exhausting device may be exhausted to outside through the sound absorbing member, thereby reducing noise generated when steam is exhausted.

DETAILED DESCRIPTION

Figure 1:
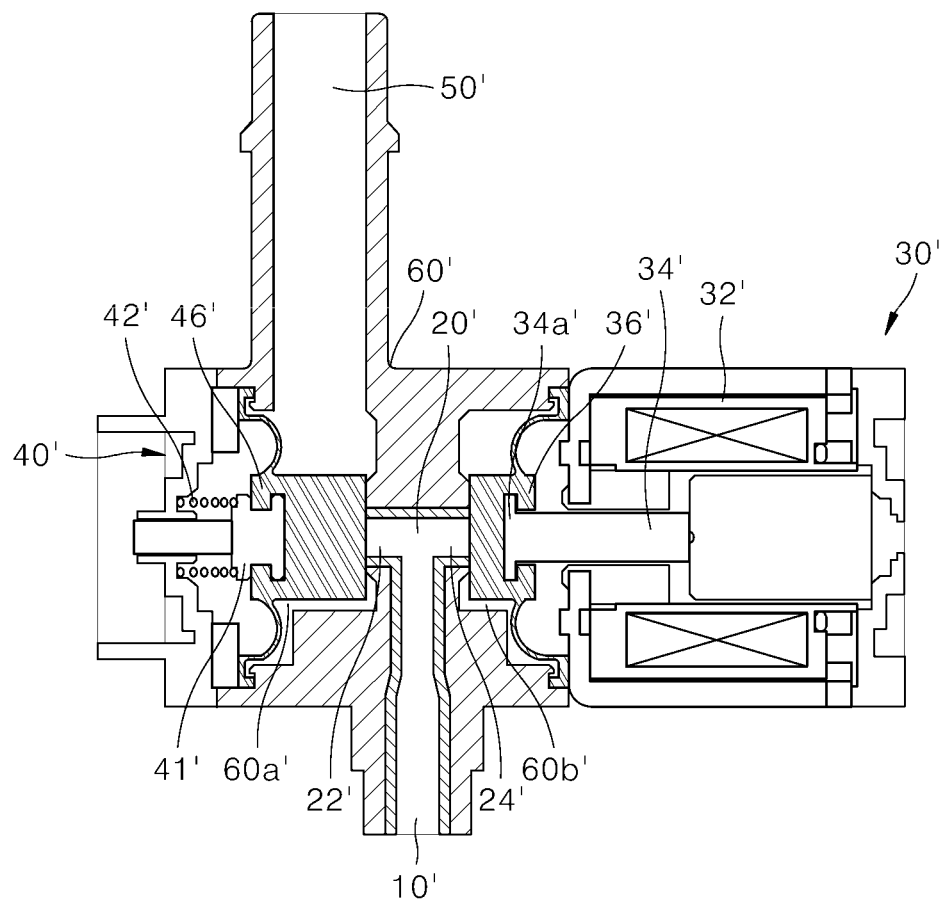
FIG. 1 shows a steam exhausting device used for an electric pressure cooker in related art.

The above-mentioned objects, features, and advantages of the present disclosure are described in detail with reference to the accompanying drawings. Accordingly, the skilled person in the art to which the present disclosure pertains may easily implement the technical idea of the present disclosure. In the description of the present disclosure, if it is determined that a detailed description of a well-known relevant technology of the present disclosure may unnecessarily obscure the gist of the present disclosure, the detailed description thereof is omitted. One or more implementations of the present disclosure are described in detail with reference to the accompanying drawings. In the drawings, same reference numerals are used to refer to same or similar components.

The present disclosure relates to a steam exhausting device that exhausts steam physically or electrically and an electric pressure cooker that electrically controls the steam exhausting device based on the internal pressure.

Structures of the steam exhausting device and the electric pressure cooker including the steam exhausting device are described in detail with reference to FIGS. 2 to 10.

Figure 2:
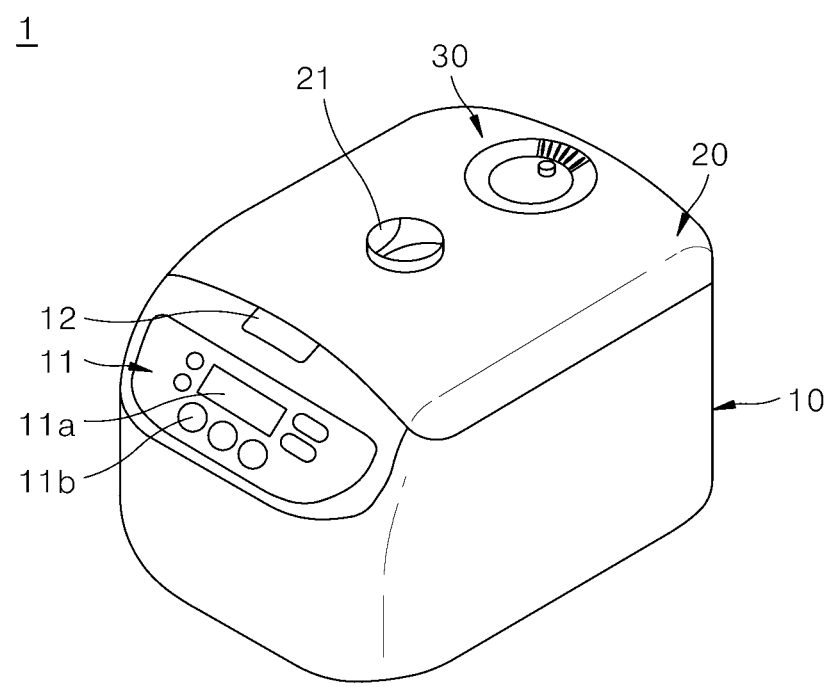
FIG. 2 is a perspective view showing an example electric pressure cooker.
Figure 3:
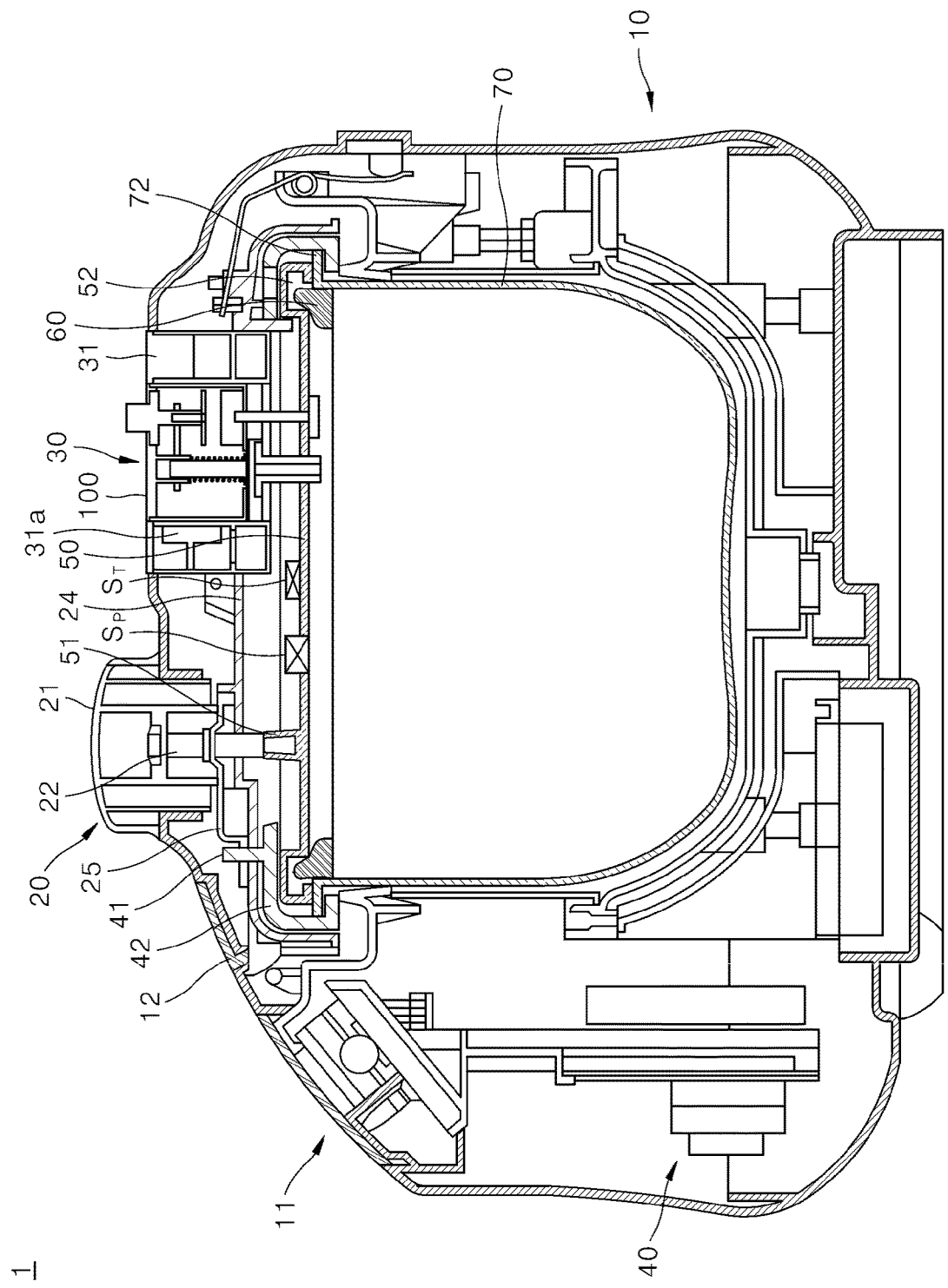
FIG. 3 is a side cross-sectional view showing the electric pressure cooker in FIG. 2.
Figure 4:
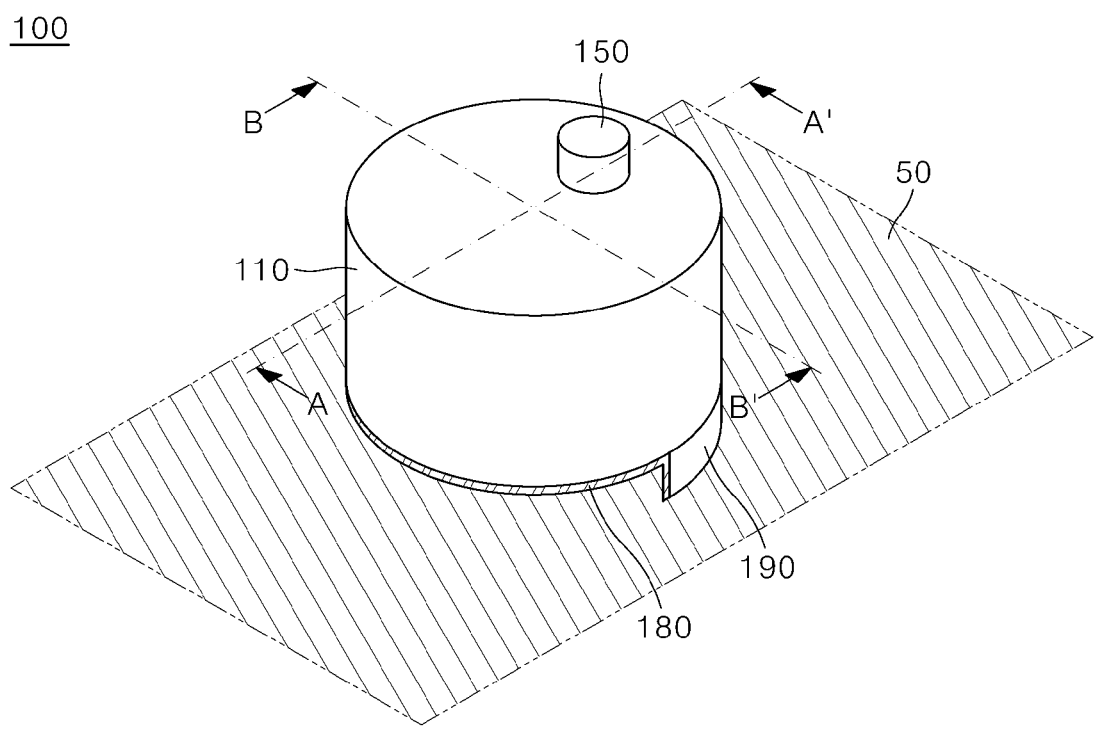
FIG. 4 is an exploded perspective view showing the steam exhaust device in FIG. 3.

FIG. 2 is a perspective view showing an example electric pressure cooker. FIG. 3 is a side cross-sectional view showing the electric pressure cooker in FIG. 2. FIG. 4 is an exploded perspective view showing the steam exhausting device in FIG. 3.

Figure 5:
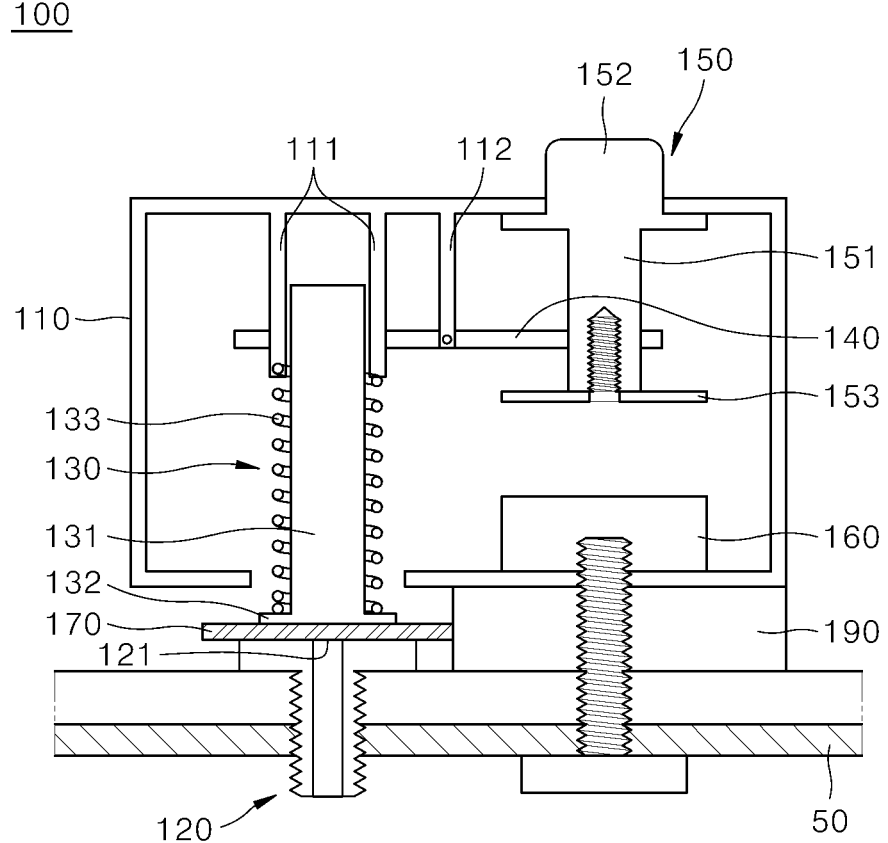
FIG. 5 shows an example of a side cross-sectional view taken along line AA' in FIG. 4 as viewed in a direction of the arrows.
Figure 6:
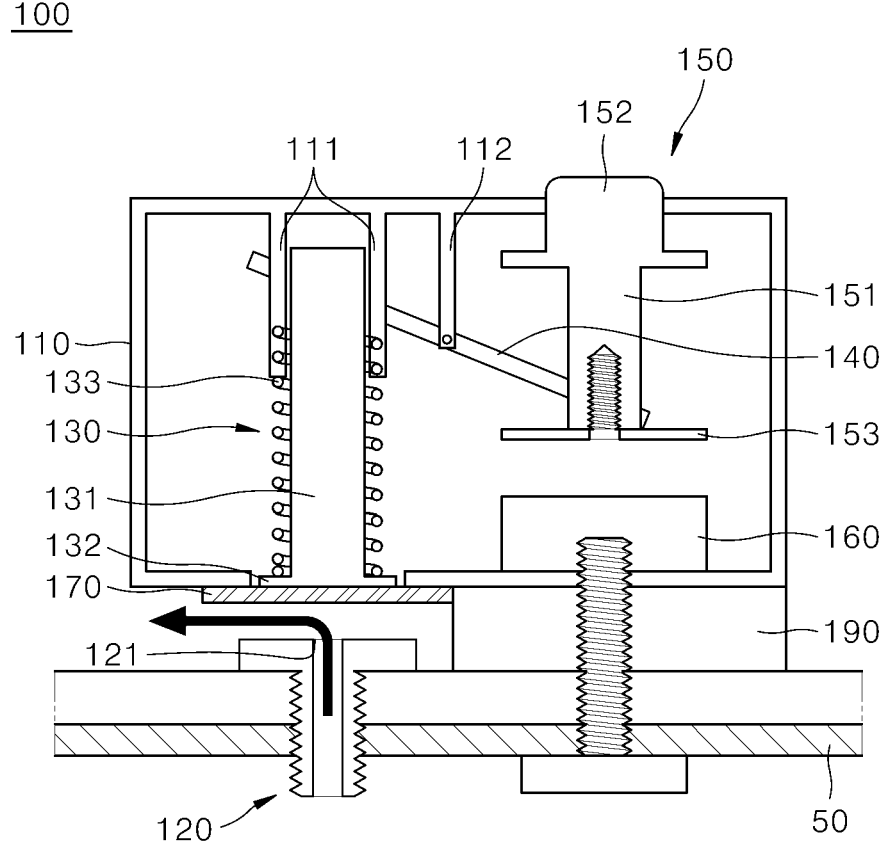
FIG. 6 shows an example lever and an example pressure member in FIG. 5 that is elevated based on pivoting of the lever.

FIG. 5 shows a side cross-sectional view taken along line A-A' in FIG. 4 in the direction of the arrows. FIG. 6 shows an example lever and an example pressure member in FIG. 5 that is risen based on pivoting of the lever.

Figure 7:
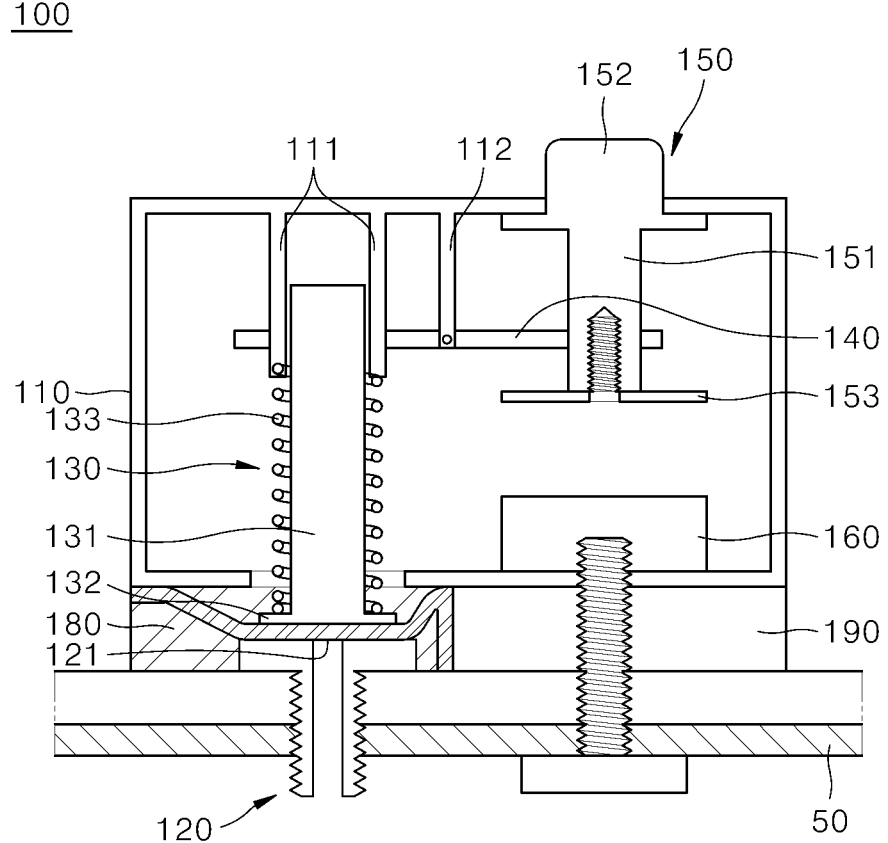
FIG. 7 shows another example of the side cross-sectional view taken along line AA' in FIG. 4 in the direction of the arrows pointing to the line AA'.
Figure 8:
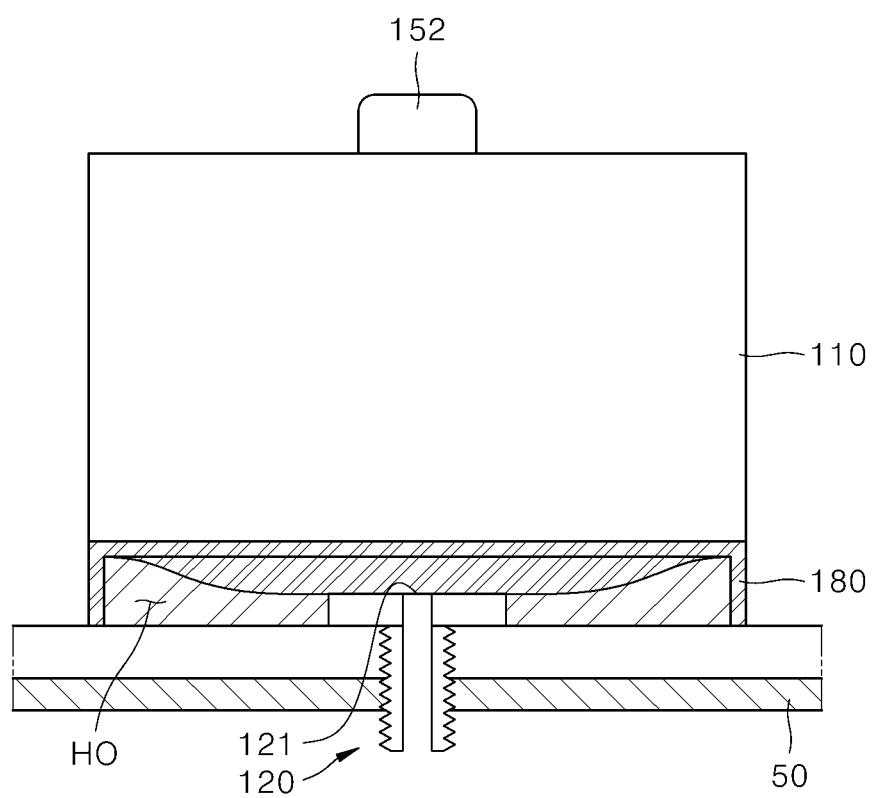
FIG. 8 is a front sectional view taken along line BB' in FIG. 4 as viewed in the direction of the arrows pointing to the line BB'.
Figure 9:
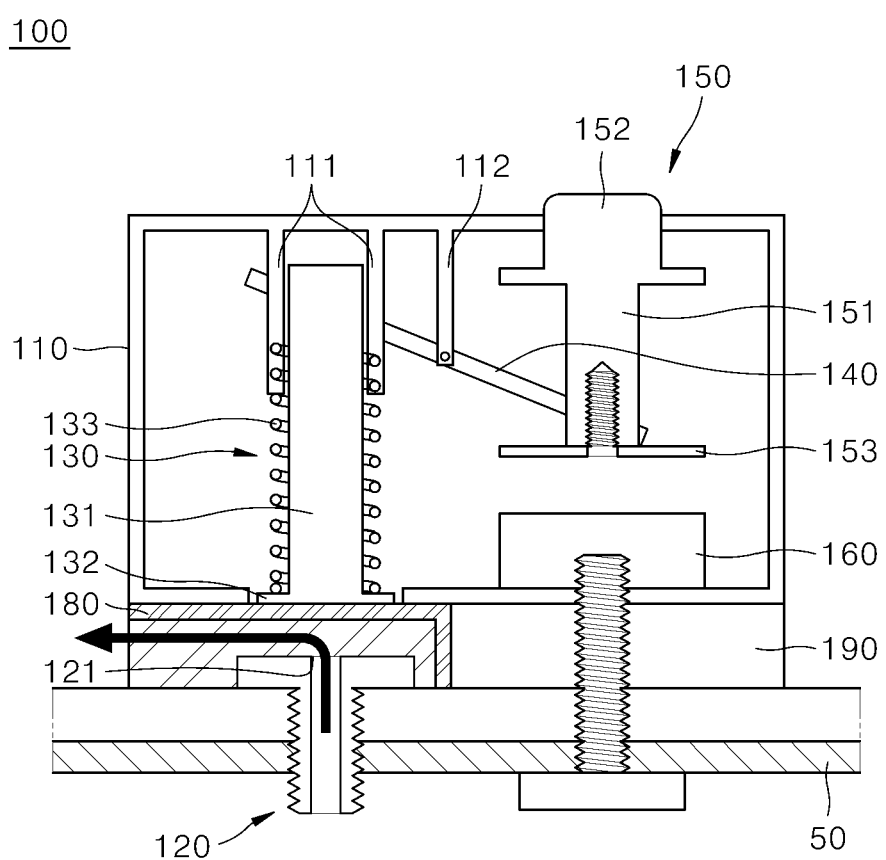
FIG. 9 shows an example lever and an example pressure member in FIG. 7 that is elevated based on pivoting of the lever.

FIG. 7 shows another example of a side cross-sectional view taken along line A-A' in FIG. 4 as viewed from the direction of the arrows pointing to the line A-A'. FIG. 8 is a front sectional view taken along line B-B' in FIG. 4 as viewed from the direction of the arrows pointing to the line B-B'. FIG. 9 shows the pressure member in FIG. 7 that is risen based on pivoting of the lever.

Figure 10:
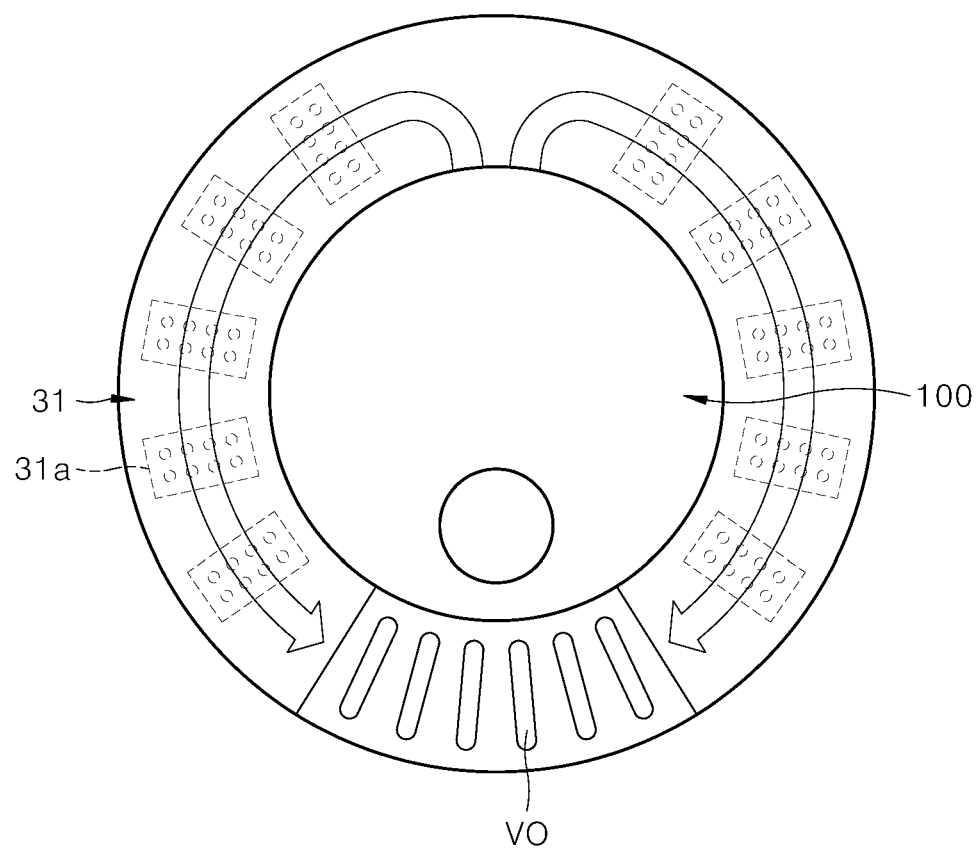
FIG. 10 shows an example of a noise reducing device that surrounds an example of a steam exhausting device.

FIG. 10 shows an example of a noise reduction device that surrounds an example steam exhaust device.

In some implementations, the electric pressure cooker 1 may use a direct heating method of directly heating the inner pot 70 based on heater coils disposed at a lower portion of a bottom and outer sides of the inner pot 70 receiving power and generating heat. In some implementations, the electric pressure cooker 1 may use an induction heating method. For example, in the induction heating method, the coils disposed at a lower portion of the bottom and outer sides of the inner pot 70 may generate heat based on induction current induced to the coils to heat the inner pot 70.

The configuration of the electric pressure cooker 1 is described below based on assumption that the electric pressure cooker 1 uses the direct heating method.

Referring to FIGS. 2 and 3, the electric pressure cooker 1 may include a main body 10 including an opened upper surface and a cover 20 that pivots with respect to a corner of the main body 10 to selectively open and close the upper surface of the main body 10.

In some implementations, the main body 10 may include an open button 12 and an operation panel 11 on a front surface of the main body 10 to open the cover 20 described below. The operation panel 11 may include a display 11a that displays, to users, state information, information on cooking state, and a time taken to cook food of the electric pressure cooker 1 and an input 11b that receives physical user operation.

In some examples, the cover 20 may include a steam exhauster 30 that includes an exposed upper surface of the steam exhauster 30 and fixed in the cover 20 to exhaust the steam generated by the electric pressure cooker 1.

The inner pot 70 may have a cylindrical shape and may accommodate grains such as rice, and a fastening protrusion 72 may be defined on an outer circumferential surface of an upper end of the inner pot 70. The inner pot 70 may be accommodated in the main body 10, and the main body 10 may include various types of devices that support the inner pot 70 and heat the inner pot 70.

The cover 20 may include an outer cover 23 coupled to the main body 10 using a hinge, a handle 21 coupled to the outer cover 23, an inner cover 24 that is coupled to a position below the outer cover 23 and that guides operation of the handle 21, and a locking ring 42 that is coupled to a position below the inner cover 24 and receives rotational force of the handle 21. In some examples, the outer cover 23 may guide operation of the handle 21. The cover 20 may further include a top plate 50 that is disposed below the locking ring 42 and fastened to a rotary shaft 22 and that supports the locking ring 42 disposed above the top plate 50 to be rotatable, and a packing 60 that is inserted into a packing groove 52 defined on an outer circumferential surface of the top plate 50 to seal an inner pot 70.

In some examples, the arm member 25 may be fastened to a handle shaft 22. The arm member 25 may have a shape in which the plate-like body is bent twice by a right angle and may have a first end of the arm member 25 bound to the handle shaft 22 and a second end bound to the fastening protrusion 41 of the locking ring 42.

The locking ring 42 may have a curved boss at an upper end of the locking ring 42 and a boss at a lower end of the locking ring 42 and may have a circular ring shape and may include hollow inner sides of the locking ring 42. In some examples, the locking ring 42 may include a boss at a lower end of the locking ring 42 to be fastened to the fastening protrusion 72 of the inner pot 70 and a fastening protrusion 41 that protrudes upward at an upper end of the locking ring 42.

The top plate 50 may include a shaft fixer 51 that fastens the handle shaft 22 and a packing groove 52 into which an outer circumferential surface of the top plate 50 may be inserted into the packing 60. The top plate 50 may perform a function for sealing the inner pot 70, and perform heat transfer with respect to the inner pot 70.

In some examples, at least one of the temperature sensor $S_T$ and the pressure sensor $S_P$ may be provided on the top plate 50 and details of the above configuration are described below.

In some cases, where a handle 21 rotates by a predetermined angle for cooking performed by the electric pressure cooker 1 including the above-described configuration, the arm member 25 fastened to the handle shaft 22 rotates together, and the fastening protrusion 41 of the locking ring 42, which is bound at a first end of the arm member 25, may rotate.

In some implementations, the locking ring 42 may be configured to rotate along an outer circumferential surface of the inner pot 70, and the locking ring 42 and the fastening protrusion 72 of the inner pot 70 may be completely engaged with each other based on rotation of the locking ring 42, so that cooking may be performed.

During cooking, the steam having the high temperature and the high pressure may be generated in the inner pot 70. The steam exhauster 30 may be fixed onto the top plate 50 described above in the cover 20 to exhaust the steam generated in the inner pot 70.

The steam exhauster 30 includes a steam exhausting device 100 and a noise reducing device 31. A structure of the steam exhausting device 100 is described below in detail with reference to FIGS. 4 to 9.

The steam exhausting device 100 may include a housing 110 having a polygonal column or a cylindrical shape. The housing 110 is an outer case of the steam exhausting device 100, and may include a pressure member 130, a lever 140, a button 150, and an electromagnet 160 described below. The housing 110 of the steam exhausting device 100 having a cylindrical shape is described below.

Referring to FIGS. 4 and 5, the housing 110 may define a first opening on an upper surface of the housing 110 and a second opening on a lower surface of the housing 110 and the first opening and the second opening are vertically spaced apart from each other. In some examples, the housing 110 may include the first opening on the upper surface of the housing 110 and the second opening on the lower surface of the housing 110 and the first opening and the second opening may be spaced apart from each other on a same vertical line. In some examples, the first opening and the second opening may be horizontally spaced apart from each other and disposed on two different vertical axes.

The steam pipe 120 may be spaced apart from the second opening on a vertical line of the second opening. In some examples, the steam pipe 120 may be disposed below the second opening and may be spaced apart from the housing 110.

The steam generated by the electric pressure cooker 1 may be introduced into the steam pipe 120. To this end, an inlet end of the steam pipe 120 into which the steam is introduced may protrude inward the top plate 50.

In order to protrude the inlet end of the steam pipe 120 inward the top plate 50, the steam pipe 120 may be bolted to the top plate 50 by a predetermined depth.

The pressure member 130 may be lowered to a discharge end of the steam pipe 120 in the housing 110 along a vertical line or vertical axis passing the second opening.

In some examples, the pressure member 130 moves vertically on a vertical line of the second opening in the housing 110 and applies preset pressure in a direction of the second opening to seal the discharge end 121 of the steam pipe 120.

The preset pressure may be set based on performance and according to design needs of the electric pressure cooker 1, for example, the preset pressure may be set to be the limit pressure that the electric pressure cooker 1 may withstand. Accordingly, based on the pressure of the steam generated inside the inner pot 70 being exceeding the limit pressure, the pressure member 130 is risen to open the discharge end 121 of the steam pipe 120 regardless of operation of the button 150 or the control of the electromagnet 160 described below.

The pressure member 130 may be disposed on the vertical line of the second opening in the housing 110 to move vertically. The pressure member 130 may apply a preset pressure in a direction of the second opening, that is, in a lower direction of the housing 110.

In order for the pressure member 130 to apply pressure in a lower direction, the pressure member 130 may be fixed in the housing 110. In one example, a first protrusion 111 may be provided on an upper surface of the housing 110 to fix the pressure member 130, and the pressure member 130 may be fixed to the first protrusion 111 provided on the upper surface of the housing 110 and may apply the preset pressure in the lower direction of the housing 110, which is an opposite direction to the first protrusion 111.

The lower end of the pressure member 130 may be lowered to the outside of the housing 110 through the second opening based on the applied pressure, and the lower end of the pressure member 130 may contact the discharge end 121 of the steam pipe 120 into which the steam is discharged. In this case, as the steam is not discharged through the steam pipe 120, the pressure inside the inner pot 70 may be maintained or increased.

In some implementations, the pressure member 130 may include a columnar pressure body 131 and a pressure end 132 provided below the pressure body 131 and having a cross-sectional area of the pressure end 132 greater than a cross-sectional area of the pressure body 131. For instance, the pressure body 131 may have an elongated cylindrical shape that extends in a vertical direction of the housing 110. The pressure end 132 may have a circular plate shape having a diameter greater than a diameter of the pressure body 131. The pressure member 130 may further include a spring 133 that has a first end fixed in the housing 110 and a second end disposed at a boundary between the pressure body 131 and the pressure end 132 and that provides an elastic force having a preset pressure.

Referring back to FIG. 5, the pressure body 131 and the pressure end 132 may have a cylindrical shape. The pressure body 131 and the pressure end 132 may be coupled to each other or may be integrated.

The cross-sectional area of the pressure end 132 may be greater than the cross-sectional area of the pressure body 131 and may be less than the cross-sectional area of the second opening. Accordingly, the pressure end 132 may vertically pass through the second opening, and may distribute the pressure applied downward through the pressure body 131 to a wide pressure range.

The spring 133 may have a first end of the spring 133 fixed to the inside of the housing 110 when the spring 133 has an elastic force and a second end of the spring 133 disposed at the boundary between the pressure body 131 and the pressure end 132. Accordingly, the spring 133 may generate the elastic force to push the pressure end 132 in the housing 110 in the direction of the second opening.

In some examples, as shown in FIG. 5, a first end of the spring 133 may be fixed to the first protrusion 111 provided on the upper surface of the housing 110. In this case, the pressure body 131 may be surrounded by the springs 133 and the position of the pressure body 131 may be fixed in the housing 110.

The pressure end 132 may be lowered to outside of the second opening based on the elastic force of the spring 133, and the lowered pressure end 132 may seal the discharge end 121 of the steam pipe 120 in a wide range.

In some examples, in order to effectively seal the discharge end 121 of the steam pipe 120, the pressure member 130 may further include a steam barrier layer 170 on the lower surface of the pressure member 130.

The steam barrier layer 170 is made of an elastic material and may have a cross-sectional area of the steam barrier layer 170 greater than a cross-sectional area of the second opening and may seal the discharge end 121 of the steam pipe 120 based on the preset pressure applied through the pressure member 130.

Referring back to FIG. 5, the steam barrier layer 170 may be coupled to the lower portion of the pressure end 132. For example, the steam barrier layer 170 may be attached or bolted to a lower surface of the pressure end 132. In some cases, where the pressure end 132 is lowered to the outside of the second opening based on the elastic force of the spring 133, the steam barrier layer 170 provided below the pressure end 132 may contact the discharge end 121 of the steam pipe 120. In some examples, the steam barrier layer 170 having the elastic force may withstand additional pressure of the spring 133 so that the steam barrier layer 170 may effectively seal the discharge end 121 of the steam pipe 120.

In some examples, referring to FIG. 6, as the steam barrier layer 170 coupled to the pressure end 132 has an area greater than an area of the second opening, the steam barrier layer 170 may seal the second opening when the pressure body 131 is risen. Accordingly, in some cases, where the steam is discharged from the discharge end 121 of the steam pipe 120, the discharged steam may not be introduced into the housing 110.

A process of rising the pressure member 130 by the user's manipulation or based on magnetic force generated by the electromagnet 160 is described below.

As another example, a steam guide member 180 may be further provided between the housing 110 including the pressure member 130 and the steam pipe 120 for efficient sealing of the discharge end 121 of the steam pipe 120.

The steam guide member 180 surrounds the discharge end 121 of the steam pipe 120, and may change, to the horizontal direction, a direction of the steam discharged from the discharge end 121 toward the second opening.

Referring to FIGS. 7 to 9, the steam guide member 180 may surround a space between the housing 110 and the boundary at which the discharge end 121 of the steam pipe 120 is seated. In other words, the discharge end 121 of the steam pipe 120 may be provided in a space defined by the steam guide member 180, and thus, the steam exhausted by the discharge end 121 may not be physically introduced into the housing 110.

Through the structure, as shown in FIG. 9, the steam guide member 180 may change, based on the pressure being not applied through the pressure member 130, the direction of the steam discharged in the direction of the second opening from the discharge end 121 of the steam pipe 120 toward one side of the steam guide member 180 (in a horizontal direction).

In some examples, the steam guide member 180 may include an elastic body, and the discharge end 121 of the steam pipe 120 may be sealed by the steam guide member 180 modified based on the pressure applied through the pressure member 130.

Referring back to FIGS. 7 and 8, in some cases, where the pressure end 132 is lowered to the outside of the second opening based on the elastic force of the spring 133, the steam guide member 180 including the elastic body may have a curved portion on the upper surface of the steam guide member 180 based on the pressure applied to the pressure end 132. The curved upper surface of the steam guide member 180 may contact the discharge end 121 of the steam pipe 120.

As the steam guide member 180 also has an elastic force, the steam guide member 180 may further endure the additional pressure of the spring 133, and thus the upper surface of the steam guide member 180 may effectively seal the discharge end 121 of the steam pipe 120.

Referring back to FIG. 5, the lever 140 may be fixed to the inside of the housing 110 and a first end of the lever 140 may be connected to the pressure member 130. In some examples, the lever 140 has a supporting point fixed to the inside of the housing 110 and a first end of the lever 140 that rotates about the supporting point connected to the pressure member 130.

The supporting point of the lever 140 may be fixed at any position inside the housing 110. In order to rotate the button 150 disposed on the vertical line or vertical axis passing the first opening and the pressure member 130 disposed on the vertical line or vertical axis passing the second opening in the opposite directions with respect to the supporting point, the supporting point of the lever 140 may be located on a normal line that connects the vertical line of the first opening and the vertical line of the second opening.

In some implementations, as shown in FIG. 5, a second protrusion 112 may be provided at any position of the normal line to connect the vertical line of the first opening and the vertical line of the second opening, on the upper surface in the housing 110, to fix the supporting point of the lever 140. The supporting point of the lever 140 may be fixed to the second protrusion 112 and the lever 140 may have a first end connected to the pressure member 130.

In some examples, the button 150 may be connected to a second end of the lever 140 and includes a magnetic body 153 on the lower surface of the button 150, and may move vertically along the vertical line of the first opening. In some examples, the button 150 may be connected to a second end of the lever 140 that rotates in an opposite direction to a first end of the lever 140 and may include the magnetic body 153 on the lower surface of the button 150 and may be lowered on the vertical line of the first opening based on the external pressure.

A first end of the lever 140 to which the pressure member 130 is connected may be a point of action, and a second end of the lever 140 to which the button 150 is connected may be a force point. Accordingly, a first end and a second end of the lever 140 may be rotated opposite to each other with respect to the supporting point.

As shown in FIG. 5, the button 150 may have a first end of the button 150 connected to a second end of the lever 140 to which the pressure member 130 is connected and is provided on a vertical line of the first opening to be lowered along the vertical line of the first opening. Accordingly, in some cases, where the button 150 is lowered based on the external pressure such as user's operation, the pressure member 130 may rise along the vertical line of the second opening by the lever 140.

In some cases, as the pressure member 130 applies a preset pressure in the direction of the second opening, the force that the lever 140 provides to the pressure member 130 (in an opposite direction to the direction of the second opening) based on the external pressure may be greater than the preset pressure applied through the pressure member 130 (in the direction of the second opening) so that the pressure member 130 rises.

In some implementations, it may be advantageous to provide a distance between the supporting point of the lever 140 and the pressure member 130 less than a distance between the supporting point of the lever 140 and the button 150 for convenience of the user operation. In other words, as the distance between the supporting point of the lever 140 and the force point of the lever 140 may be greater than the distance between the supporting point of the lever 140 and the action point of the lever 140, even if the user applies less magnitude of pressure to the button 150, a greater magnitude of force may be applied through the pressure member 130.

As shown in FIGS. 6 and 9, in some cases, where the pressure member 130 rises due to the external pressure applied to the button 150, the discharge end 121 of the steam pipe 120 that is sealed by the pressure member 130 is opened and the steam vertically discharged through the discharge end 121 may be horizontally exhausted.

The button 150 may include a columnar button body 151, a button operation 152 that is provided on an upper portion of the button body 151 and that protrudes to the outside of the first opening and reduces the external pressure, and a magnetic body 153 fastened to the lower surface of the button body 151. The button 150 may transmit external pressure applied by a user to the lever 140 to thereby elevate the pressure body 131.

The button body 151 and the button operation 152 may each have a cylindrical shape. The button body 151 and the button operation 152 may be coupled to each other or may be integrated.

The cross-sectional area of the lower end of the button operation 152 may be greater than the cross-sectional area of the first opening. Accordingly, the lower end portion of the button operation 152 may prevent the button 150 from leaving to the upper portion of the first opening.

The magnetic body 153 may be attached or bolted to the lower surface of the body. In some examples, in order to receive the attraction in a wide range based on the operation of the electromagnet 160 described below, the cross-sectional area of the magnetic body 153 may be greater than the cross-sectional area of the button body 151.

The electromagnet 160 may be provided on the bottom surface of the housing 110 on a vertical line of the first opening. The electromagnet 160 may generate selective attraction with respect to the magnetic body 153 provided at a lower portion of the button 150.

The electromagnet 160 may have a cylindrical shape and may be fixed to the bottom surface of the housing 110. For example, as shown in FIG. 5, the electromagnet 160 may be bolted to the fixing member 190 and the top plate 50 provided at the bottom of the housing 110 at one time. In some examples, the fixing member 190 and the top plate 50 may be spaced apart from each other and may be fastened to each other so that excessive heat transfer is not performed from the top plate 50 into the housing 110.

The electromagnet 160 may generate attraction with respect to the magnetic body 153 based on the current applied from outside. In some examples, the electromagnet 160 may generate a magnetic force only when the current is applied to the electromagnet 160. In other words, based on the current not being applied to the electromagnet 160, the electromagnet 160 may not generate the attraction with respect to the magnetic body 153, and based on the current applied to the electromagnet 160, the electromagnet 160 may generate the attraction with respect to the magnetic body 153.

The magnetic body 153 is attracted to the electromagnet 160 based on the attraction generated by the electromagnet 160, and the button 150 may be lowered. Based on the button 150 being lowered, the pressure member 130 may rise by the lever 140 along the vertical line of the second opening.

In some examples, as the pressure member 130 applies a preset pressure in the direction of the second opening, in order for the pressure member 130 to rise, a force provided, by the lever 140, to the pressure member 130 (in an opposite direction to the direction of the second opening) based on the attraction between the electromagnet 160 and the magnetic body 153 may be greater than the preset pressure applied through the pressure member 130 (in a direction of the second opening).

In some implementations, it may be advantageous to provide a distance between the supporting point of the lever 140 and the pressure member 130 less than the distance between the supporting point of the lever 140 and the button 150 in order to reduce an amount of current applied to the electromagnet 160. In other words, the distance between the supporting point of the lever 140 and the force point of the lever 140 greater than the distance between the supporting point of the lever 140 and the action point of the lever 140, a greater amount of force may be applied to the pressure member 130 even when a less amount of current is applied to the electromagnet 160.

Referring to FIGS. 6 and 9, in some cases, where the pressure member 130 rises based on the attraction between the magnetic body 153 and the electromagnet 160, the discharge end 121 of the steam pipe 120, which is sealed by the pressure member 130, is opened, and the steam discharged through the discharge end 121 in the vertical direction may be exhausted in the horizontal direction.

In summary, the steam exhausting device 100 may exhaust the steam exhausted through the steam pipe 120 in a horizontal direction based on the external pressure or a magnetic force of the electromagnet 160 provided in the steam exhausting device 100.

According to the present disclosure, the steam flow path and components of the device may be spatially separated from each other so that the steam may not affect components of the device during exhaust of steam, thereby increasing a lifespan of the device and resolving pipe blockage generated due to the complicated structure to exhaust the steam in related art.

In some examples, according to the present disclosure, the steam is exhausted physically or electrically based on the simple configuration, thereby reducing production cost of devices, facilitating cleaning of devices, and preventing damage of devices caused by the high-temperature steam.

FIGS. 3 and 10 show the steam exhauster 30 provided in the cover 20 including a noise reducing device 31, as well as the steam exhausting device 100 described above.

The noise reducing device 31 surrounds the steam exhausting device 100 to define the steam flow path between a horizontal exhaust outlet HO of the steam exhausting device 100 and a vertical exhaust outlet VO defined at an opposite side to the horizontal exhaust outlet HO and defined in an upper direction of the cover 20.

The noise reduction device 31 has a hollow ring shape and may surround the cylindrical steam exhausting device 100. The steam exhausting device 100 may exhaust steam through the horizontal discharge outlet HO shown in FIG. 8, and the steam exhausted by the steam exhausting device 100 may be exhausted to the vertical exhaust outlet VO through the steam flow path defined by the noise reducing device 31, as shown in FIG. 10.

In this case, a plurality of sound absorbing members 31a may be provided in the noise reducing device 31. The sound absorbing member 31a may include a porous member that reduces noise through holes defined on a surface or an inside of thereof, or a plate-like member that reduces noise based on vibration of a plate.

Accordingly, the steam exhausted by the steam exhausting device 100 passes through the sound absorbing member 31a, thereby reducing noise generated when the steam is exhausted.

The control operation of the electric pressure cooker 1 is described below in detail with reference to FIG. 11.

Figure 11:
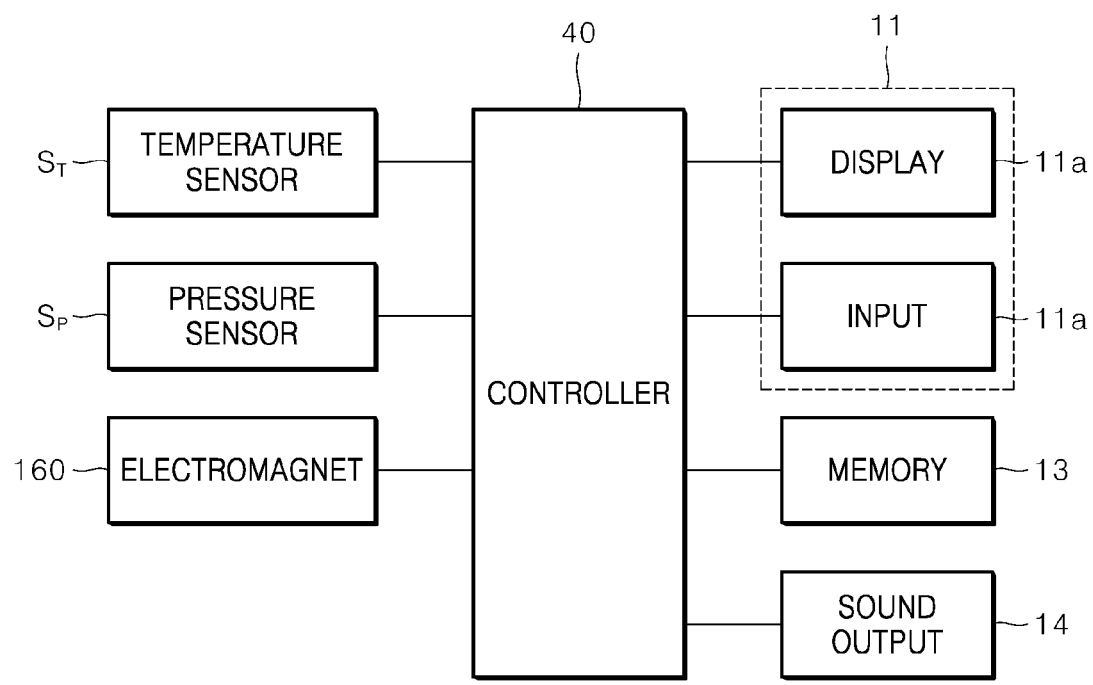
FIG. 11 shows a block diagram of an example control flow of the electric pressure cooker in FIG. 2.

FIG. 11 shows a block diagram of an example control flow of the electric pressure cooker in FIG. 2.

For example, a controller 40 of an electric pressure cooker 1 may perform data processing with reference to the memory 13 (e.g., non-statutory memory device such as a random access memory). For example, the controller 40 may control the display 11a provided in the operation panel 11 described with reference to FIGS. 2 and 3 to display a specific screen related to cooking of the electric pressure cooker 1 and may compare the signal received from the user through the input 11b with the signal stored in the memory 13. In some examples, the controller 40 may control a sound output 14 to output various types of sound signals related to the cooking of the electric pressure cooker 1.

In some examples, the controller 40 may control the steam exhauster 30 to selectively exhaust the steam based on the pressure inside the inner pot 70. In some examples, the controller 40 may control the electromagnet 160 based on the pressure inside the inner pot 70 to control the steam exhausting device 100 to exhaust the steam.

In some implementations, the controller 40 may be electrically connected to a temperature sensor $S_T$ and a pressure sensor $S_P$ to receive the temperature from the temperature sensor $S_T$ or receive the pressure inside the inner pot 70 from the pressure sensor $S_P$. In this case, the temperature sensor $S_T$ and the pressure sensor $S_P$ may be provided in a top plate 50 as shown in FIG. 3.

In order to prevent the temperature sensor $S_T$ from directly contacting the steam, the temperature sensor $S_T$ may contact an upper surface of the top plate 50. The top plate 50 may be made of a material having a very high thermal conductivity. Accordingly, the temperature sensor $S_T$ may sense the temperature of the steam on an upper surface of the top plate 50.

In some examples, the pressure sensor $S_P$ may be provided on the lower surface of the top plate 50 to be in direct contact with the steam, and may pass through the top plate 50. However, in order to minimize penetration of moisture contained in the steam, the pressure sensor $S_P$ may pass through the top plate 50.

The controller 40 may receive the temperature information from the temperature sensor $S_T$ to identify the pressure inside the inner pot 70. In some examples, the controller 40 may identify the pressure inside the inner pot 70 by calculating the pressure with respect to the temperature using various types of formulas used in the art, and may identify the pressure corresponding to the temperature with reference to a look up table (LUT) stored in a memory 13.

In some cases, where the pressure in the inner pot 70 is identified or pressure information is provided by the pressure sensor $S_P$, the controller 40 may determine whether the pressure in the inner pot 70 exceeds a reference pressure. Based on a determination that the pressure inside the inner pot 70 exceeds the reference pressure, the controller 40 may apply the current to generate the magnetic force to the electromagnet 160.

In some examples, the controller 40 and the electromagnet 160 may be electrically connected to each other. In some cases, the controller 40 may apply, based on the pressure inside the inner pot 70 exceeding the reference pressure, the current to the electromagnet 160. Accordingly, the attraction to the magnetic body 153 provided below the button 150 may be generated by the electromagnet 160, and as the magnetic body 153 is attracted to the electromagnet 160, the steam exhauster 30 may exhaust the steam.

As a process of exhausting the steam by the steam exhausting device 100 based on the operation of the electromagnet 160 has been described above with reference to FIGS. 6 and 9, details thereof are omitted.

Various substitutions, modifications, and changes can be made within the scope that may not deviate from the technical idea of the present disclosure for the skilled person in the art to which the present disclosure pertains, the above-mentioned disclosure is not limited to the above-mentioned implementation and the accompanying drawings.

Other implementations are within the scope of the following claims.

What is claimed is:

1. A steam exhausting device coupled to a cover of an electric pressure cooker, the steam exhausting device comprising:
    a housing having an upper surface that defines a first opening and a lower surface that defines a second opening vertically spaced apart from the first opening;
    a steam pipe that is spaced apart from the second opening, that extends along a vertical line passing the second opening, and that is configured to receive steam generated by the electric pressure cooker;
    a pressure member that is disposed in the housing, that is arranged along the vertical line passing the second opening, and that is configured to move down to a discharge end of the steam pipe;
    a lever disposed in the housing, the lever having a first end connected to the pressure member;
    a button connected to a second end of the lever and configured to move vertically along a vertical axis passing the first opening, the button comprising a magnetic body disposed on a lower surface of the button; and an electromagnet disposed at a bottom surface of the housing, the vertical axis passing the first opening and the electromagnet.

2. The steam exhausting device of claim 1, further comprising a steam barrier layer made of an elastic material and disposed at a lower surface of the pressure member, the steam barrier layer being configured to block the discharge end of the steam pipe based on the pressure member moving down to the steam pipe, wherein a cross-sectional area of the steam barrier layer is greater than a cross-sectional area of the second opening.

3. The steam exhausting device of claim 1, further comprising a steam guide member that surrounds the discharge end of the steam pipe and that is configured to change, to a horizontal direction, a direction of steam discharged toward the second opening through the discharge end of the steam pipe.

4. The steam exhausting device of claim 3, wherein the steam guide member comprises an elastic body that is configured to, based on the pressure member moving down, be deformed by the pressure member to thereby block the discharge end of the steam pipe.

5. The steam exhausting device of claim 1, wherein at least one of the steam pipe or the electromagnet is bolted to a top plate of the cover that is configured to cover an inner pot of the electric pressure cooker.

6. The steam exhausting device of claim 1, wherein the housing comprises:

a first protrusion that is disposed inside the housing, that protrudes downward from the upper surface of the housing, and that is configured to guide movement of the pressure member; and a second protrusion that is disposed inside the housing, that protrudes downward from the upper surface of the housing, and that is coupled to the lever.

7. The steam exhausting device of claim 1, wherein the pressure member comprises:

a pressure body that extends toward the second opening;

a pressure end disposed vertically below the pressure body, the pressure end having a cross-sectional area greater than a cross-sectional area of the pressure body; and a spring having a first end fixed to the housing and a second end disposed at a boundary between the pressure body and the pressure end.

8. The steam exhausting device of claim 1, wherein the button further comprises:

a button body; and a button operation part that is disposed at an upper portion of the button body and that protrudes to an outside of the upper surface of the housing through the first opening, and wherein the magnetic body is fastened to a lower surface of the button body.

9. The steam exhausting device of claim 1, wherein the electromagnet is configured to selectively generate attraction force for the magnetic body based on current applied from an outside of the housing.

* * * * *